P. BOCH.
BRAKE FOR AUTOMOBILES.
APPLICATION FILED JULY 9, 1912.
1,108,685.
Patented Aug. 25, 1914.
2 SHEETS—SHEET 2.
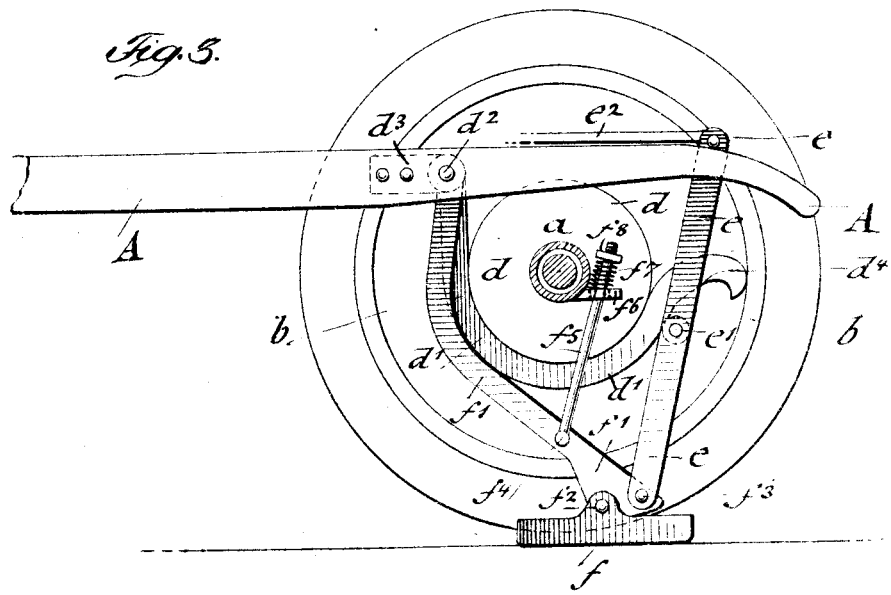
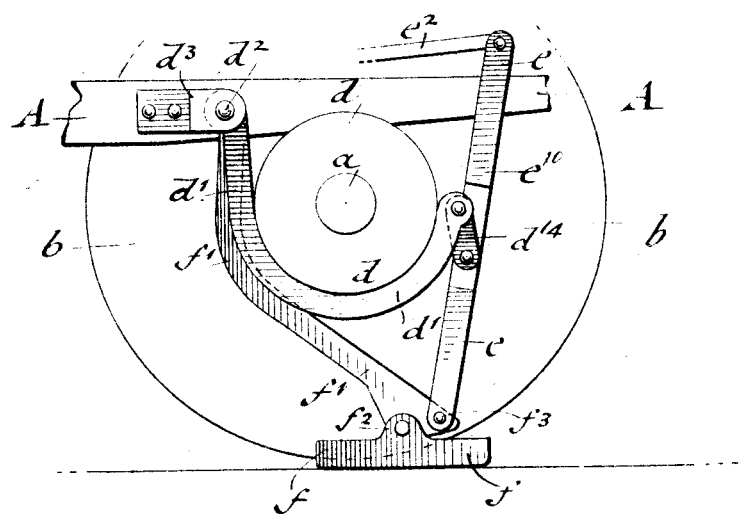

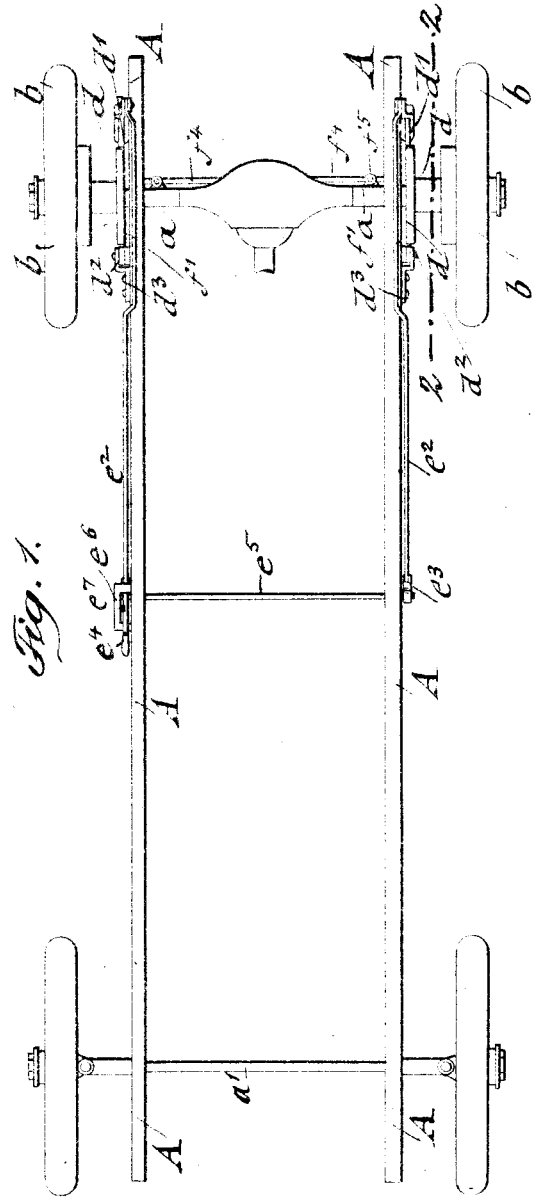
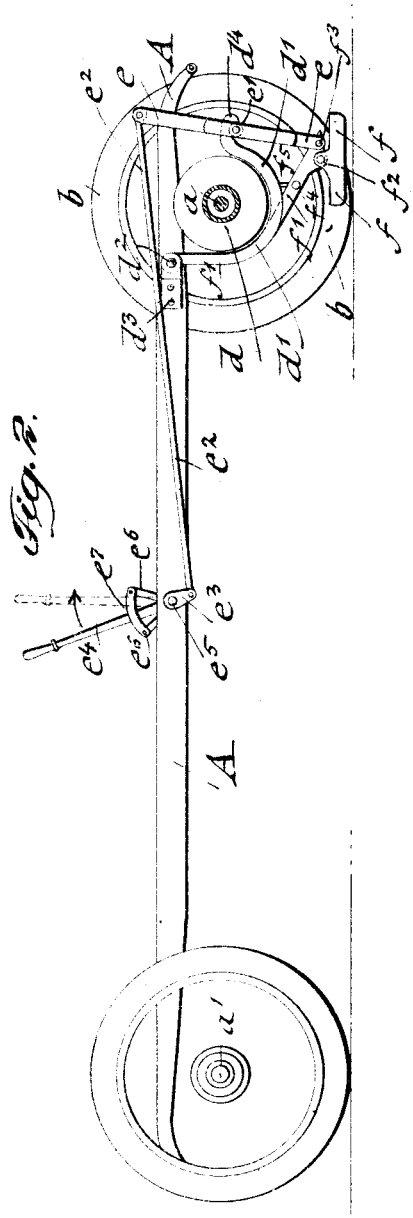

UNITED STATES PATENT OFFICE.

PHILIPP BOCH, OF NEW YORK, N. Y., ASSIGNOR OF ONE-HALF TO PAUL REICH, OF NEW YORK, N. Y.

BRAKE FOR AUTOMOBILES.

1,108,685.  Specification of Letters Patent.  Patented Aug. 25, 1914.

Application filed July 9, 1912. Serial No. 708,489.

*To all whom it may concern:*

Be it known that I, PHILIPP BOCH, a citizen of the United States of America, residing in New York, in the borough of Manhattan, county and State of New York, have invented certain new and useful Improvements in Brakes for Automobiles, of which the following is a specification.

This invention relates to an improved brake for automobiles and other vehicles by which the brake-action on the driving-wheels is increased by the frictional contact of auxiliary drag brake-shoes with the ground and at the same time the wheels lifted, so that the abrading action of the ground on the tires is prevented and the tires protected against injury and wear; and for this purpose the invention consists of a brake for automobiles which comprises an ordinary brake and lever-mechanism for use with the brake-disks on the driving-wheels of the vehicle, in combination with auxiliary drag brake-shoes operated by said lever-mechanism and adapted to be placed in frictional contact with the ground, while simultaneously the driving-wheels are lifted so that the pneumatic tires clear the ground without forming frictional contact with the same.

The invention consists further of a spring-actuated suspension-frame for the auxiliary drag brake-shoes, so that the latter are returned into their normal position as soon as the action of the lever-mechanism on the wheel-brakes is discontinued.

The invention consists further of certain details of construction which will be fully described hereinafter and finally pointed out in the claims.

In the accompanying drawings, Figure 1 represents a plan-view of an automobile-frame showing my improved brake for the driving-wheels of the same. Fig. 2 is a side-elevation, partly in section, on line 2, 2, Fig. 1. Fig. 3 represents a side elevation on a larger scale showing the wheel brake shoe and the drag brake shoe in action and the wheel lifted off the ground. Fig. 4 represents a side elevation similar to Fig. 3 of a modified construction thereof.

Similar letters of reference indicate corresponding parts throughout the different figures of the drawings.

Referring to the drawings, A represents the frame of an automobile or other vehicle, $a$ the rear axle, $a^1$ the front-axle and $b$ the rear or driving wheels of the same. On the hubs of the rear driving-wheels $b$ are arranged friction-disks $d$ to which the usual brake-shoes $d^1$ are applied, the upper front-ends of the brake-shoes being pivoted to the frame $A$ at $d^2$ and to a bracket $d^3$ of the same, while the rear-ends of the brake-shoes are provided with inclined portions $d^4$ which rest on antifriction-rollers $e^1$ of brake-levers $e$, which are pivoted at their upper ends to the rear-ends of connecting-rods $e^2$ leading to crank-arms $e^3$ that are operated by a hand-lever $e^4$ in the usual manner. The crank-arms $e^3$ are applied to a transverse shaft $e^5$ which turns in bearings of the frame $A$. The hand-lever $e^4$ is guided along a keeper $e^6$ and so located as to be within easy reach of the chauffeur. The main-portions of the ordinary brake-shoes $d^1$ are made concentric with the brake-disks $d$ on the hubs of the driving-wheels, so that when the actuating lever $e^4$ pulls the brake levers $e$ forward the anti-friction rollers $e^1$ thereof ride inward under the inclines $d^4$ of the brake shoes $d^1$ and lift the latter into contact with the brake disks $d$. A partial backward pull of the lever $e^4$ will thus set the ordinary brakes. When it is desired, however, as in case of an emergence for preventing accident, or for other reasons, that a sudden and positive brake-action should be exerted on the vehicle, auxiliary drag brake-shoes $f$ are brought into use in addition to the ordinary brakes. These drag brake-shoes are pivoted by center lugs or ears $f^2$ to the lower ends of auxiliary brake-levers $f^1$. These brake levers $f^1$ are applied at their upper ends to the pivots $d^2$ of the ordinary brake-shoes, sidewise of the latter, and are pivoted at their lower ends at $f^3$ to the lower ends of the brake levers $e$. The auxiliary brake-shoes $f$ are made of steel or other suitable material and are rounded-off at their outer ends so as to readily pass over obstructions on the ground when they are in raised position and when they are not called into action in case of emergency.

The auxiliary brake levers $f^1$ are connected at some distance above the auxiliary brake-shoes with a transverse rod $f^4$, which is supported by means of suspension-rods $f^7$ in keepers $f^5$ on the rear-shaft $a$, helical cushioning-springs $f^7$ being interposed between the keepers $f^6$ and screw-nuts $f^8$ at the upper ends of the suspension-rods $f^5$. The cushioning-springs $f^7$ hold the suspension-rods $f^5$, auxiliary levers $f^1$ and auxiliary brake-shoes $f$ in normally raised position above the ground, so that they are at a sufficient distance above the ground without forming any contact with the same.

Whenever both brake-devices, the ordinary brakes and the auxiliary drag brake-shoes, are to be called into action, the hand brake-lever $e^4$ is moved backward to a sufficient extent so as to actuate both brake-devices. The backward motion of the actuating brake-lever $e^4$ through the cranks $e^3$ and connecting-rods $e^2$ swings the brake lever $e$ in forward direction, so that the antifriction-rollers $e^1$ thereon are moved along the inclined underside of the rear-part of the ordinary brake-shoes into the position shown in Fig. 3. This action lifts the brake shoes $d^1$ and lowers the brake lever $e$, whereby the auxiliary levers $f^1$ are lowered, together with the auxiliary drag brake-shoes and the spring-actuated suspension-rods $f^5$, so that the ordinary brake-shoes are placed into intimate frictional contact with the brake-disks, while the auxiliary drag brake-shoes are placed into frictional contact with the ground, and produce thereby a quick and effective brake-action on the vehicle. Simultaneously with the lowering of the auxiliary drag brake-shoes, the driving-wheels $b$ are raised above the ground, so that the pneumatic tires are placed out of contact therewith, whereby any injury to the same by abrasion or otherwise is prevented. As soon as the action on the brake-lever $e^4$ is discontinued and the same returned to its former position, the ordinary brakes are moved away from their brake-disks, while the auxiliary drag brake-shoes are raised to their normal position above the ground and the driving-wheels lowered until their tires form contact with the ground. This is assisted by the cushioning-springs $f^7$ and suspension-rods $f^5$ by which the auxiliary levers $f^1$ and auxiliary drag brake-shoes $f$ are returned to their normally raised position above the ground, while the return of the brake levers $e$ permits the receding of the ordinary brake-shoes away from the circumference of the brake-disks on the driving-wheels.

For lighter automobiles the construction shown in Fig. 4 is used, in which the rear-ends of the ordinary drag brake-shoes are connected by means of short pivot-links $d^{14}$ with the recessed brake-levers $e^{10}$ that make the connection between the connecting brake-rod and the lower ends of the auxiliary levers $f^1$. In this construction, the connecting pivot-links $d^{14}$ between the ordinary brake-shoes and the brake-levers produce the same effect on the ordinary drag brake-shoes and auxiliary brake-shoes as the inclined and hook-shaped rear-ends of the ordinary brake-shoes on the antifriction-rollers, shown in Fig. 3, which latter construction is mainly designed for heavy automobiles and heavy delivery-wagons.

By means of the auxiliary drag brake-shoes, by which a powerful antifriction-action is exerted by the ground on the brake-shoes, in connection with the ordinary brakes, it is possible to arrest the motion of an automobile, even when the same is running at considerable speed, in a much quicker manner than with the ordinary brake-devices heretofore in use. At the same time the driving-wheels are lifted away from the ground, so that no abrading friction or other injury is exerted on the pneumatic tires during the application of brakes, while effective means are placed within the use of automobilists for preventing accidents by the sudden and efficient brake-action obtained simultaneously by the ordinary brake-shoes and auxiliary brake-shoes. The keeper $e^6$ for the hand brake-lever $e^4$ may be provided with a stop-device $e^7$ intermediate the normal position and the extreme backward position of the same, so as to permit either the application of the ordinary drag brake-shoes $d^1$, or the joint application of both the ordinary and auxiliary drag brake-shoes by the same brake-lever mechanism described.

The auxiliary drag brake-shoes, their brake-levers and the operating lever-mechanism for the same may be applied to automobiles which are provided with the ordinary brake-devices, in which case a second hand brake-lever is arranged sidewise of or in close proximity to the ordinary brake-lever, so that one brake-lever may be grasped separately or both jointly by the chauffeur, according as simply an ordinary brake-action, or a joint ordinary and emergency brake-action is desired to be exerted on the vehicle. The auxiliary or emergency brake can thus be applied to any automobile in use so as to increase the braking efficiency of the same without injury or damage to the tires.

I claim:

1. The combination of a disk brake mechanism, a drag brake mechanism, and a single brake setting mechanism operative to set one of said brakes on a partial stroke and both thereof on a full stroke.

2. The combination of a brake disk, a pivoted brake shoe therefor, an auxiliary brake lever pivoted adjacent to the pivot of said brake shoe, a drag brake shoe pivoted to the opposite end of said auxiliary brake lever, a brake lever pivoted to said auxiliary brake lever and provided with means for engaging the free end of said brake shoe, and an actuating device connected with said brake lever.

3. The combination of a brake disk, a pivoted brake shoe therefor, an auxiliary brake lever pivoted adjacent to the pivot of said brake shoe, a drag brake shoe pivoted to the opposite end of said auxiliary brake lever, a brake lever pivoted to said auxiliary brake lever and provided with a link connecting said brake lever with the free end of said brake shoe, and an actuating device connected with said brake lever.

In testimony, that I claim the foregoing as my invention, I have signed my name in presence of two subscribing witnesses.

PHILIPP BOCH.

Witnesses:
 PAUL GOSPEL,
 JOHN MUNDSON.